Figure 3:
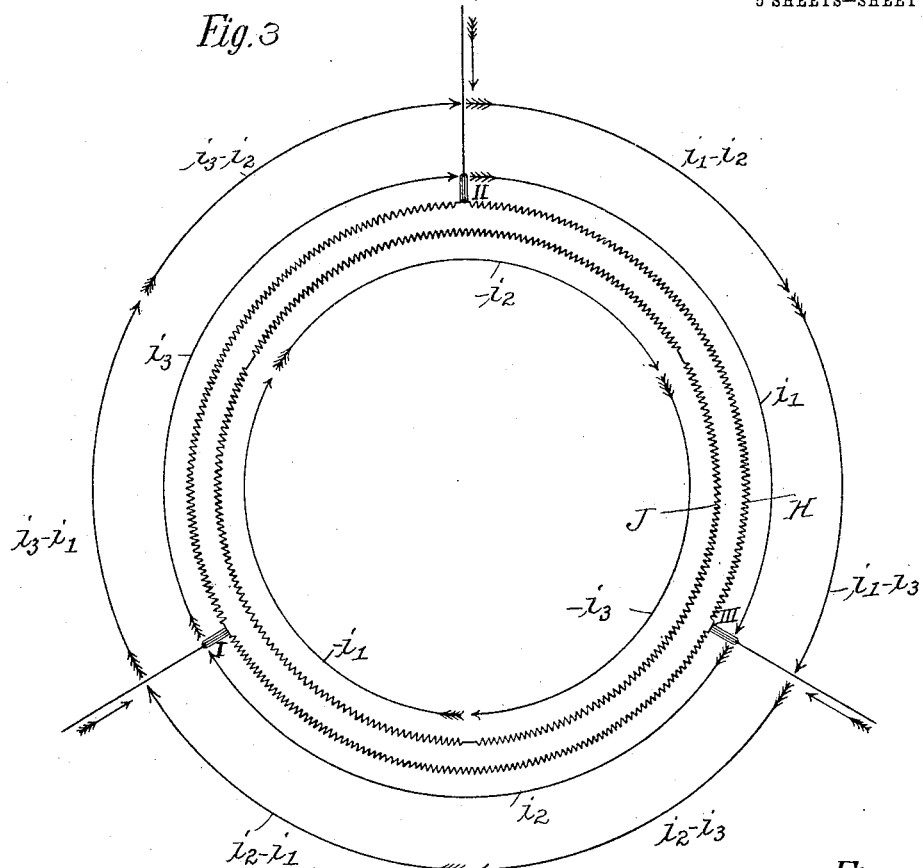

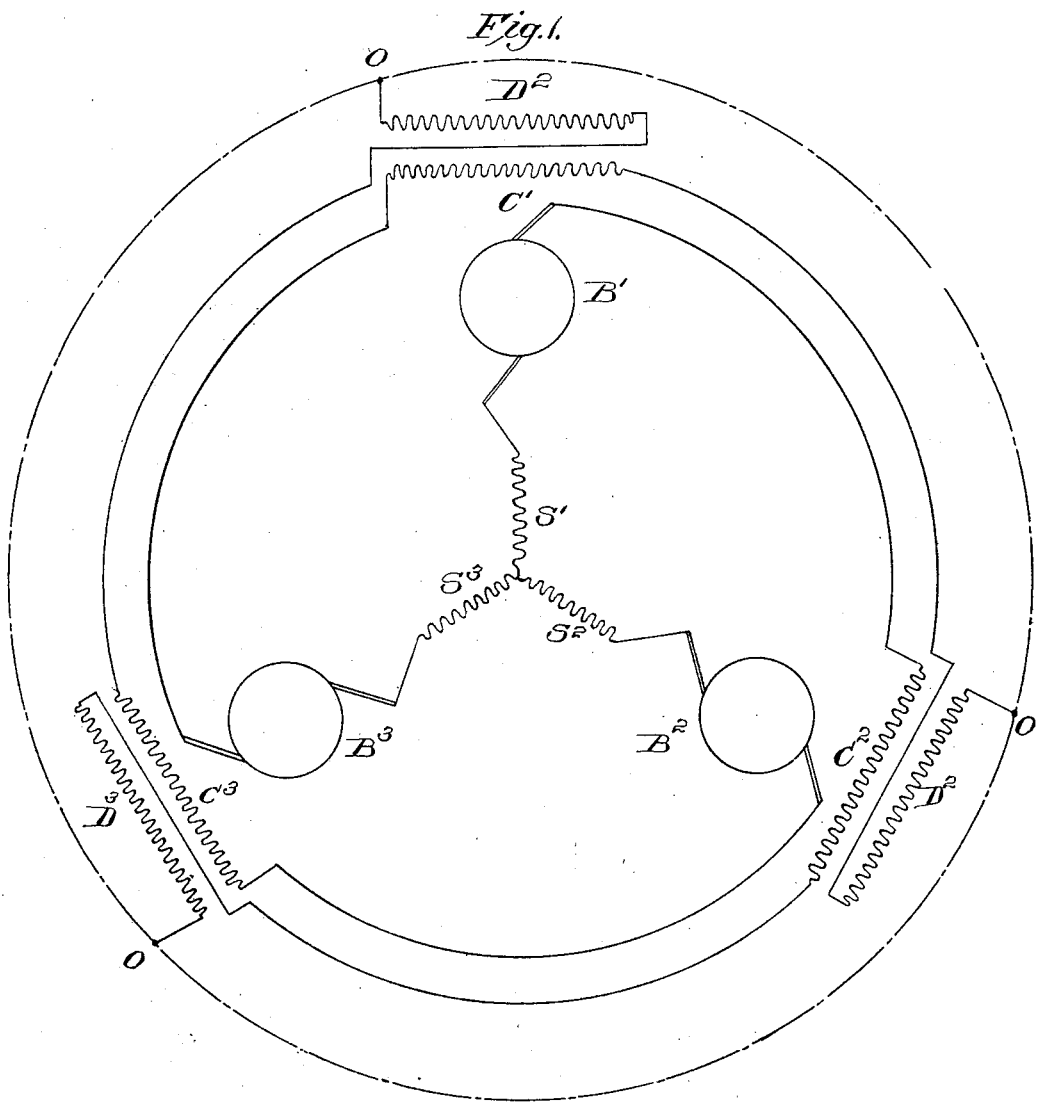

No. 815,356. PATENTED MAR. 20, 1906.
M. LEBLANC.
SYSTEM OF EXCITATION FOR INDUCTION MACHINES.
APPLICATION FILED JAN. 28, 1903.

Witnesses:
R. W. Orear.
F. T. Chapman.

Inventor
Maurice Leblanc
by Lyons & Bissing, Attys.

No. 815,356. PATENTED MAR. 20, 1906.
M. LEBLANC.
SYSTEM OF EXCITATION FOR INDUCTION MACHINES.
APPLICATION FILED JAN. 28, 1903.

5 SHEETS—SHEET 3.

Witnesses:
K. W. Crean
F. T. Chapman.

Inventor
Maurice Leblanc,
by Lyons & Bissing, Att'ys.

No. 815,356. PATENTED MAR. 20, 1906.
M. LEBLANC.
SYSTEM OF EXCITATION FOR INDUCTION MACHINES.
APPLICATION FILED JAN. 28, 1903.
5 SHEETS—SHEET 4.
Fig. 8.
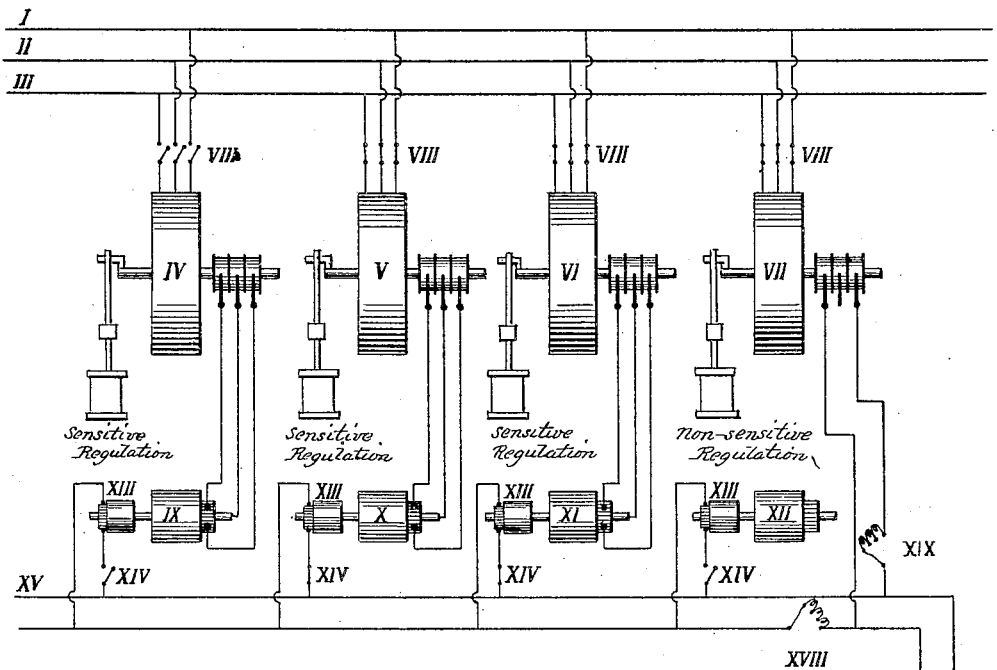
Fig. 9.
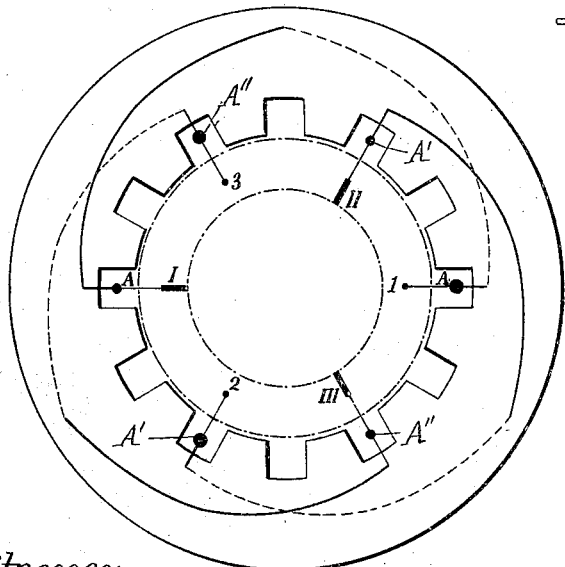
Witnesses:
K. H. Orear
F. T. Chapman
Inventor
Maurice Leblanc
by Lyons & Bissing, Att'ys.

No. 815,356. PATENTED MAR. 20, 1906.
M. LEBLANC.
SYSTEM OF EXCITATION FOR INDUCTION MACHINES.
APPLICATION FILED JAN. 28, 1903.
5 SHEETS—SHEET 5.
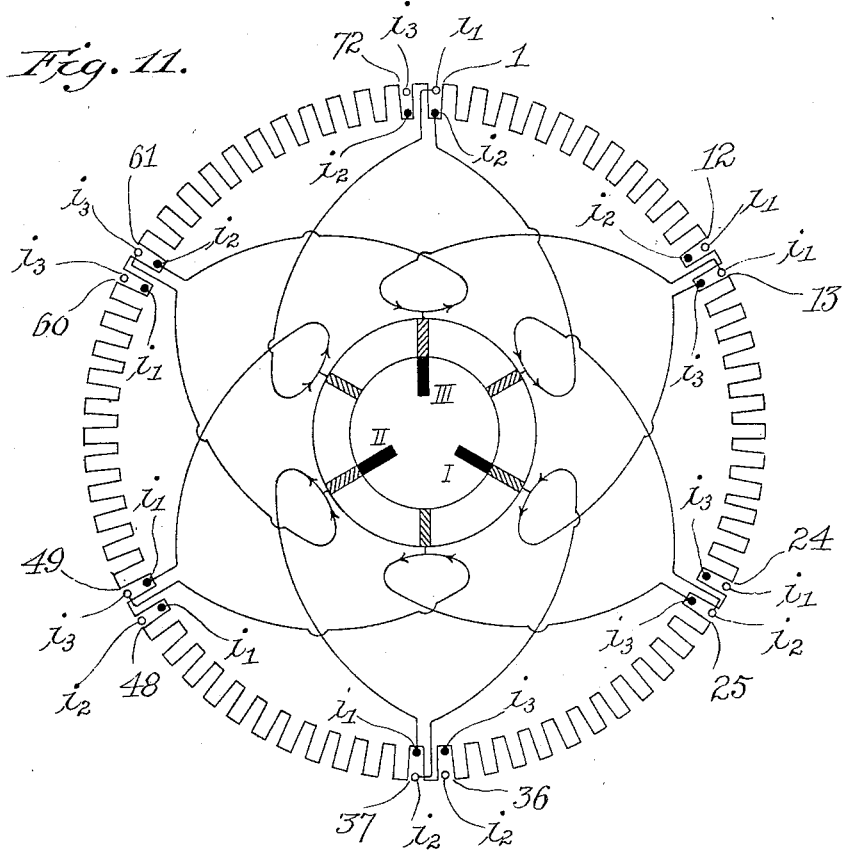
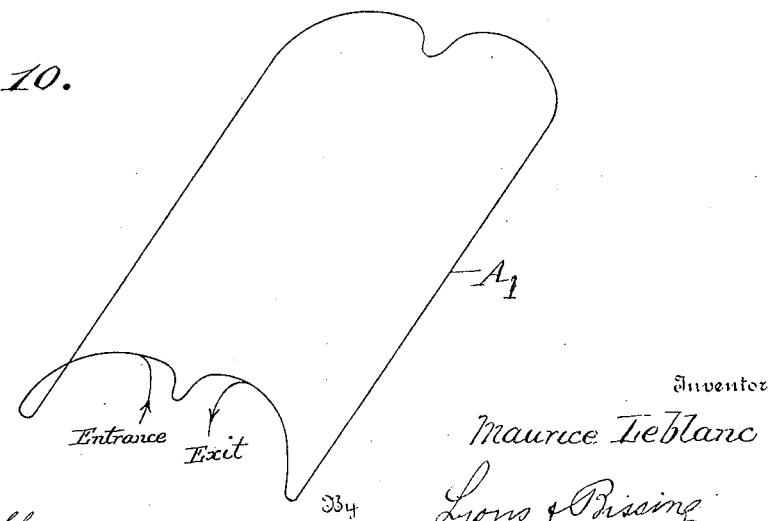

UNITED STATES PATENT OFFICE

MAURICE LEBLANC, OF PARIS, FRANCE, ASSIGNOR TO WESTINGHOUSE ELECTRIC AND MANUFACTURING COMPANY, A CORPORATION OF PENNSYLVANIA.

SYSTEM OF EXCITATION FOR INDUCTION-MACHINES.

No. 815,356.          Specification of Letters Patent.          Patented March 20, 1906.

Application filed January 28, 1903. Serial No. 140,933.

*To all whom it may concern:*

Be it known that I, MAURICE LEBLANC, a citizen of the Republic of France, and a resident of Paris, France, have invented a certain new and useful Improvement in Systems of Excitation for Induction - Machines, of which the following is a specification.

It is now well understood in the art that alternating-current induction-machines, or, as they are otherwise known, "asynchronous machines," when located in branches derived from a main line fed by an alternating generator operate as motors when rotating with a speed below synchronism and as generators when driven at a speed above synchronism. In either case the inducing member or primary is traversed by currents of line frequency and the induced member or secondary by currents of slip frequency. What is more, whether the asynchronous machine operates as a motor or as a generator it takes from the line the currents necessary to magnetize it—that is to say, it takes from the line the wattless current, which lags ninety degrees behind what may be called the "energy-current." Expressing the matter in a different way, the currents in the several members of asynchronous machines tend to lag, owing to the fact that they are obliged to generate a magnetic field. The resultant current in either of these two circuits may therefore be considered as compounded from an energy-current in phase with the electromotive force and a wattless current ninety degrees behind it. This wattless current, which is due to the self - induction of the machine and which causes the electromotive force and the resultant current to be out of phase with each other, gives rise to one of the principal defects of asynchronous machines.

One of the objects of the present invention is to remove this defect in an expeditious way by impressing upon either member of the asynchronous machine by a proper exciter an alternating wave of electromotive force of the frequency normally existing in that member, but ninety degrees in advance of the energy-current, and, therefore, one hundred and eighty degrees in advance of the wattless current, so as to neutralize this wattless current—that is to say, I add what is, in effect, a negative reactance to the asynchronous machines to reduce the apparent self-induction of the machine to zero, or what is the same thing, to make it operate with unit-power factor. Looked at in another way, my exciter, in effect, furnishes the necessary wattless or magnetizing currents to the asynchronous machines instead of requiring the line-currents to furnish them. Since, however, it is far more efficient to impress this advanced wave of alternating electromotive force upon the induced member of the asynchronous machine, which is traversed by currents of the comparatively low slip frequency than upon the inducing member, which is traversed by currents of the higher line frequency, this invention will be more specifically described under the aspect that my exciter which generates the advanced wave of alternating electromotive force is applied to the induced member of the asynchronous machine. So, too, for the sake of clearness, my invention will be described as more specifically applied to a three-phase alternating machine, although it will manifestly operate with any other number of phases.

Another object of my invention is to impress upon the secondary or induced member of the asynchronous machine an electromotive force in opposition to the voltage effect of the armature-current. This will thus produce the effect of an apparent negative ohmic resistance which will act to reduce the effective secondary resistance of the asynchronous machine. When the asynchronous machine acts as a motor, the addition of a negative resistance will reduce the slip frequency, and if the added apparent negative resistance is equal to the internal secondary resistance the induction-motor may be operated at a constant synchronous speed while still acting as an induction-machine. By making the added apparent negative resistance greater than the internal secondary resistance the induction - motor will increase in speed with increase of load. In the case of induction-generators the apparent negative resistance added to the induced member will also decrease the slip or drop in frequency in the generator, so that if the total apparent secondary resistance is zero the induction-generator will operate at constant synchronous frequency. If the total apparent secondary resistance is made negative, we will have an induction-generator in which the frequency will increase with increase of load or will maintain constant frequency with a speed dropping with increase of load.

Still another object of my invention is to use a synchronous alternating-current generator, commonly called an "alternator," in conjunction with a number of induction-generators in such a manner that the alternator fixes the frequency and potential of the currents which the induction-generators shall furnish. This, so far, is a well-known arrangement; but I so regulate the action that the alternator will drop in speed with increase of load, whereas the induction-generators will maintain a practically constant speed under variations of load. An increasing load on the system will thus produce an increased slip on the induction-machines, so that they may carry greater loads, and the total load will be more uniformly distributed. At the same time I add one of my exciters to the secondary of each of the induction-generators, which exciter thus furnishes to these secondaries the necessary wattless or magnetizing currents. By then properly varying the magnitude of the exciting-currents furnished to the induction secondaries under different loads by varying the speeds at which the exciters are driven these exciters will furnish all the wattless currents which the induction-generators require, and there will be no wattless currents passing between the alternator and the induction-machines.

Coming now to the means which I have devised for effecting the objects above indicated and more especially to the means which I have devised for adding an apparent negative reactance and an apparent negative resistance to the induced or secondary members of asynchronous machines, I may say that Hutin and Leblanc in their United States patent, No. 613,204, of October 25, 1898, have described a system of excitation in which they impress upon the induced members of asynchronous machines an advanced wave of electromotive force of a character which neutralizes the self-induction of the machine—that is to say, of a character which furnishes the wattless currents—necessary for its magnetization. Restricting ourselves for the sake of clearness of description to the case in which the currents $i_1$ $i_2$ $i_3$ in the secondary or induced members are triphase, I may say that Hutin and Leblanc in the patent referred to provide as exciters three current-generators of the direct-current type, having commutators and brushes resting thereon. The armature-circuit of the first exciter is connected to that lead of the secondary circuit of the asynchronous machine which carries the current $i_1$. The armature-circuit of the second exciter is connected to the lead of the asynchronous secondary which carries the current $i_2$, and the armature-circuit of the third exciter is connected to the lead of the asynchronous secondary which carries the current $i_3$; but the field of the first exciter is by separate field-windings and a proper system of interconnections, in effect, excited by a current $i_2$ $i_3$. The field-circuit of the second exciter is energized by a current of $i_3$ $i_1$, and the field-circuit of the third exciter is excited by a current of $i_1$ $i_2$. It is rigorously proved in the specification of Patent No. 613,204 by means of a vector diagram that three generators of the direct-current type so connected and excited will supply to the asynchronous machine currents of a proper phase to neutralize its self-induction—that is, will furnish to the asynchronous machine the currents proper for its magnetization without requiring the machine to call upon the line for such current. This proof need not be repeated here; but in Patent No. 613,204 there are required as many exciter-generators of the direct-current type as there are phases to the secondary of the asynchronous machine, and, furthermore, the fields of these generators of the direct-current type are energized by separate field-windings. Now I have discovered that I may substitute for the number of separate exciters of the patent in question a single exciter and yet attain the same result formerly effected by the multiplicity of exciters. This new single exciter is also a generator of the direct-current type whose rotor-armature is supplied with dephased windings of such character that the armature itself furnishes the proper magnetic flux to its stator-field, so that the necessity for a separate field-winding on the stator of the exciter is dispensed with. Besides, by adding to the field of my new exciter a winding in series with the exciter-armature and of a character to produce a magnetic flux having an axis at right angles to the brushes of the exciter-armature I have discovered that I can cause the new exciter to supply to the secondary of the asynchronous machine an electromotive force in opposition to the voltage effect of the currents in the asynchronous secondary, thus giving the effect of a negative ohmic resistance added to this secondary.

Figure 2:
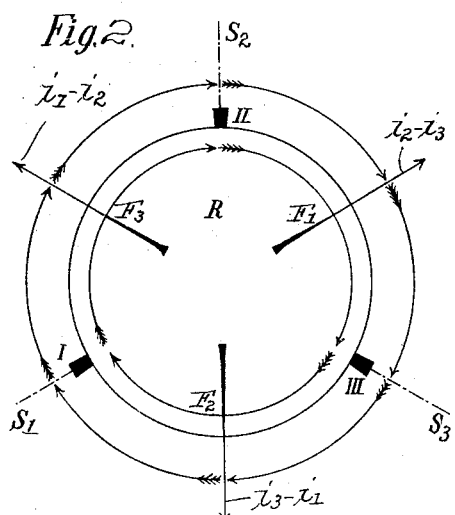
Figure 4:
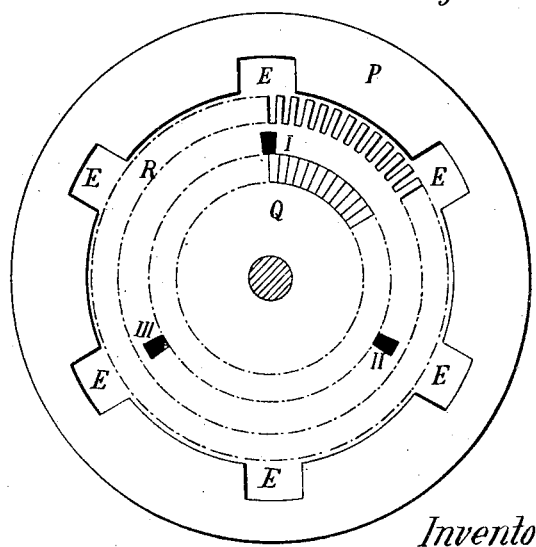
Figure 5:
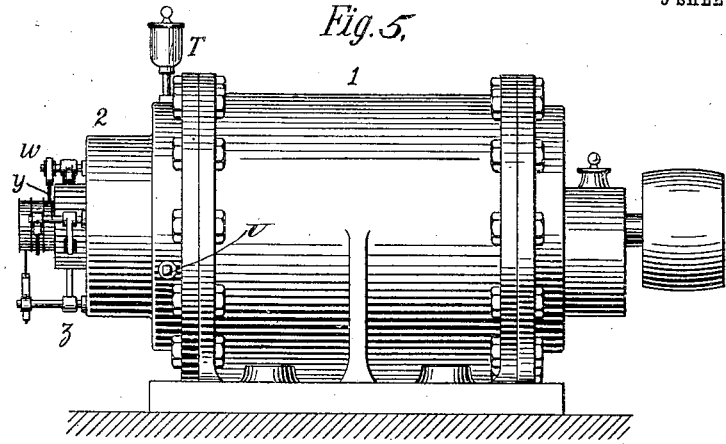
Figure 6:
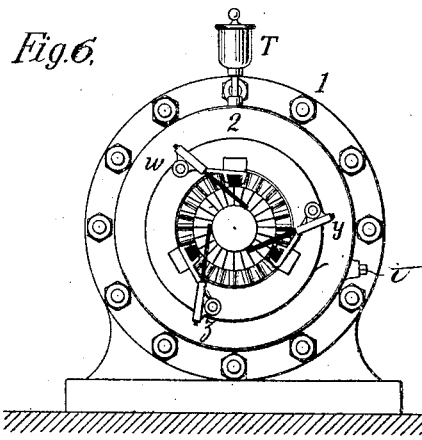
Figure 7:
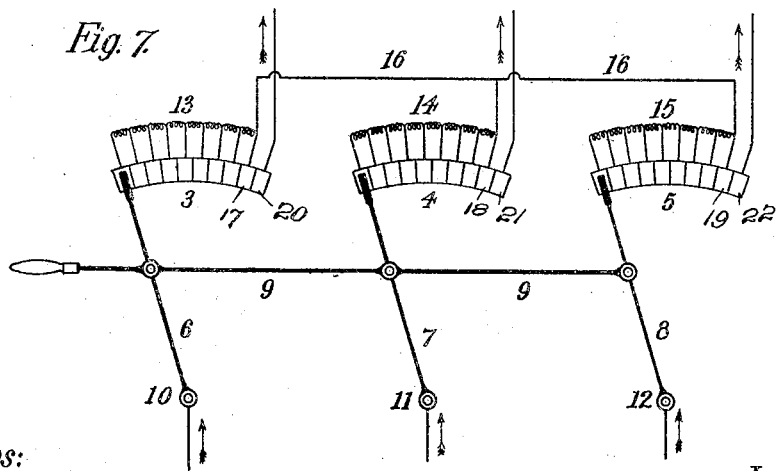

In the drawings, Figure 1 is a diagram of the system of excitation of Patent No. 613,204. Fig. 2 is a diagram showing the magnetic axes and the distribution of currents on the rotor-armature of my new exciter. Fig. 3 is a diagram showing the dephased armature-windings of my new exciter and the distribution of currents thereon. Fig. 4 shows an end elevation of the rotor-armature and stator-field of my new exciter. Fig. 5 shows a side elevation of this new exciter. Fig. 6 shows an elevation of the same. Fig. 7 shows a diagram of the starting-rheostats to be used with my exciter. Fig. 8 shows an alternator and coöperating induction-machines, with my exciters applied to the latter. Fig. 9 shows the stator of my exciter provided with a separate field-winding for diminishing the apparent resistance of the asynchronous machine. Fig. 10 shows one of a number of like bobbins with which the armature of my exciter is wound, and Fig. 11 shows a diagram of the system of interconnecting the dephased armature-windings of my exciter.

In Fig. 1 I have indicated the system of excitation of Patent No. 613,204. I have indicated at the center of this figure the three triphase secondary circuits of the asynchronous machine which is to have its self-induction neutralized. At three equally-displaced points around the center of the figure I have indicated three exciter-generators of the direct-current type having rotor-armatures with brushes resting thereon and having stator-fields. It is to be understood that these rotor-armatures are supplied with commutators and armature-windings, as is common in direct-current generators, and it is furthermore to be understood that the stator-field structures are laminated and built in the usual way. All this will be plain from the prior patent. I have assumed a Y connection for the three secondary circuits $S'$, $S^2$, and $S^3$ of the single asynchronous machine which is to be regulated, although I might have shown a delta connection. The secondary circuit $S'$ is connected to one of the brushes resting on the armature $B'$ of the first of the exciter-generators of the direct-current type. Continuing to trace this circuit, it passes through the armature just specified, then in a given direction through the field-coil $C^2$ of the second exciter, and, finally, in the opposite direction through the field-coil $D^3$ of the third exciter to the neutral point or circle O. Tracing similar circuits for the asynchronous secondary circuits $S^2$ and $S^3$, it is readily seen that if the asynchronous secondary circuits $S'$ $S^2$ $S^3$ carry currents $i_1$ $i_2$ $i_3$, respectively, the first exciter has its armature connected to the circuit carrying a current $i$ and has its field traversed by a current $i_2$ $i_3$ and that the second exciter has its armature connected to the circuit carrying a current $i_2$ and its field traversed by a current $i_3$ $i_1$. It is finally seen that the armature of the third exciter is connected to a circuit carrying a current $i_3$ and that its field is traversed by a current $i_1$ $i_2$. Each field varies periodically into the common frequency of the currents $i_1$ $i_2$ $i_3$ in the secondary circuits. Now, as stated above, it is proved in the prior patent that with such a system of excitation as has just been described each exciter-armature impresses upon that secondary circuit to which it is connected an electromotive force which has the same frequency as that of the current in the secondary circuits—a fact readily apparent—and that the phase of this impressed electromotive force thus furnished by each exciter-armature is ninety degrees in advance of the current in that asynchronous secondary circuit to which it is connected. In order to bring about this desired phase relation, it is seen that each exciter-armature has been connected to its corresponding asynchronous secondary circuit and that each armature has been rotated to cut across a magnetic field having a flux intensity proportional to the difference of the currents flowing in the other asynchronous circuits.

The problem which I have set myself to solve is to devise a single exciter-generator of the direct-current type having, say, three brushes resting on its commutator at points one hundred and twenty degrees apart, so that the exciter-armature circuit between the second and third brushes—that is, between the first pair of brushes—shall be connected to the first asynchronous secondary circuit, so that the armature-circuit between the third and the first exciter-brushes—that is, between the second pair of brushes—shall be connected to the second asynchronous secondary circuit and so that the armature-circuit from the first to the second exciter-brushes—that is, between the third pair of brushes—shall be connected to the third secondary circuit of the asynchronous machine. Thereupon the armature-circuit between the first pair of brushes must cut across a magnetic field, in this case generated by the armature-windings themselves, having an intensity proportional to the difference in the currents which flow in the second and the third secondary circuits, respectively. The armature-winding between the second pair of brushes must cut across a magnetic field having an intensity proportional to the difference of the currents which flow in the third and first secondary circuits, respectively. Finally, the armature-windings between the third pair of brushes must cut a magnetic field having an intensity proportional to the difference of the currents which flow in the first and second secondary circuits, respectively. More briefly stated, the problem which I have set myself to solve is to devise a single exciter-generator of the direct-current type with, say, three equally-spaced brushes, so that the armature-winding between a given pair of brushes shall be connected to the corresponding asynchronous secondary circuit and so that, furthermore, the armature-winding between this given pair of brushes shall cut across a magnetic field proportional to the difference in the currents in the two other asynchronous secondary circuits. By preference I generate this magnetic field by the action of the armature-winding itself. If I succeed in devising a single exciter which shall fulfil these conditions, it will now be evident that I may connect the three brushes of this exciter to the secondary circuits of the asynchronous machine. Upon rotating the exciter its several armature-circuits will each cut across a magnetic field which varies periodically and at the same frequency as that of the secondary currents. These fields will each have an intensity to impress upon each exciter-armature circuit in its rotation an electromotive force of the proper phase to diminish or neutralize the self-induction of the currents in each secondary circuit. Put in other words, the exciter will furnish some or all of the magnetization currents for the asynchronous machine which may now operate with unit-power factor.

I have indicated in Fig. 11 an armature-winding which fulfils the conditions I have just proposed, it being understood that the rotary armature is to be used in connection with a stator-field of the kind indicated at P in Fig. 4, having six notches E equally displaced on its inner surface, but having no field-winding for the purpose of producing the type of field which I have described at length above. So far as I am now concerned the stator structure simply serves as a path of small magnetic reluctance to close the magnetic circuits generated by the armature.

I have indicated in Fig. 10 one of the numerous similar bobbins $A_1$, which I employ and place upon the armature structure to constitute its armature-winding. These bobbins may be wound with any desired number of turns upon a mandrel of proper shape, and when finished one wire of entrance will pass into the bobbin and one wire of exit will pass out of the bobbin. Supposing at first, for the sake of simplicity, that the body of the armature, which will be laminated, carries six equally-displaced grooves 1, 13, 25, 37, 49, and 61, and suppose, furthermore, that the commutator had six corresponding sections. I place six of the bobbins $A_1$ in the six grooves just referred to in the following manner. I take the first bobbin and place one of its straight sides in the grooves 1 and its opposite parallel side in the groove 37. I place one straight side of the second bobbin in the groove 13 and its opposite parallel side in the diametrically opposite groove 49, and so on for the other four bobbins; but I arrange matters so that any bobbin which has one of its straight sides at the top of one groove has its opposite straight side in the bottom of the diametrically opposite groove, this being convenient for the purpose of keeping track of the direction of currents in the various wires. I now interconnect the ingoing and outgoing wires of the six bobbins and the six commutator-plates (shown in Fig. 11) in a manner indicated with sufficient clearness in the drawings. If we designate by $i_1$ the current which flows from the brush II across the armature to the brush III, we shall find by tracing the circuits that a current of intensity $i_1$ will traverse in a given direction the straight portions of the bobbins at the tops of the armature-grooves 1 13 and will traverse in the opposite direction the straight portions of these bobbins which lie in the bottoms of the diametrically opposite grooves 37 49. Corresponding remarks will apply to the current $i_2$, flowing from the brush III to the brush I, and to the current $i_3$, flowing from the brush I to the brush II. The outer portion of the grooves 1 and 13 are thus seen to be traversed by a current $i_1$. The outer portions of the grooves 25 37 are traversed by a current $i_2$, and the outer portions of the grooves 49 61 are traversed by a current $i_3$. These currents all flow in a given direction. The inner portions of the grooves 37 49 are traversed by a current $i_1$, the inner portions of the grooves 61 1 are traversed by a current $i_2$, and the inner portions of the grooves 13 25 are traversed by a current $i_3$. These currents last mentioned in the inner portions of the grooves all flow in a direction opposite to that of the currents first mentioned in the outer part of the grooves. If now we consider a larger number of armature-grooves—say seventy-two—and a corresponding number of commutator-sections, it will be evident from what has been said, at least to any one who is skilled in the art of winding armatures, that I can cause the current $i_1$ to pass in a given direction through the outer windings in the grooves 1 to 24, inclusive, that I can cause the current $i_2$ to pass in the same direction in the outer portion of the windings in the grooves 25 to 48, inclusive, and that I can cause the current $i_3$ to pass still in the same direction in the outer portions of the grooves 49 to 72, inclusive. It will, furthermore, be evident that at the same time a current $i_1$ will flow in a direction opposite to that just referred to in the windings in the bottom portions of the grooves 37 to 60, inclusive, that the current $i_2$ will flow in this opposite direction in the bottom portion of the grooves 61 to 12, inclusive, and that the current $i_3$ will also flow in this opposite direction in the windings in the bottom portions of the grooves 13 to 36, inclusive. If now we consider Fig. 3, we shall find that I have attempted to indicate the outer armature-winding, which has just been described, by the zigzag circle H and the inner armature-winding by the zigzag circle J. I have placed alongside of that portion of the winding H which runs from the brush II to the brush III a curved arrow (marked $i_1$) to indicate that a current $i_1$ is traversing this portion of the armature-winding. So, too, I have placed a curved arrow $i_2$ alongside of that portion of the outer armature-winding H which runs from the brush III to the brush I to indicate that this portion of the armature-winding is traversed by a current $i_2$. Then I have placed a curved arrow $i_3$ alongside of that portion of the outer armature-winding H which runs from the brush I to the brush II to indicate that this portion of the outer armature-winding is traversed by a current $i_3$. The curved arrows placed on the inside of the inner armature-winding J in Fig. 3 indicate that the portions of the inner armature-windings adjacent to the arrows are respectively traversed by currents $i_1$, $i_2$, and $i_3$. If we compare Fig. 3 with Fig. 11, under the assumption that the armature-winding has been extended to cover, say, seventy-two grooves in the manner above specifically described, it will be found that the currents flowing in the outer armature-windings have been properly represented by the three curved arrows, each one hundred and twenty degrees long, placed on the outside of the circle H and that the currents flowing in the inner armature-windings have been properly represented by the three curved arrows, each one hundred and twenty degrees long, placed on the inside of the circle J in Fig. 3. Pursuing the subject still further, it is found that all the grooves from 1 to 12, inclusive, have their outer armature-windings traversed by currents $i_1$ in a given direction and their inner armature-windings traversed by currents $i_2$ going in the opposite direction—that is to say, each of the grooves from 1 to 12, inclusive, may be assumed as traversed by a current $i_1 i_2$. Similarly, the grooves 13 to 24, inclusive, are each found, in effect, to be traversed by currents $i_1 i_3$, the grooves 25 to 36, inclusive, by currents $i_2 i_3$, the grooves 37 to 48, inclusive, by currents $i_2 i_1$, the grooves 49 to 60, inclusive, by currents $i_3 i_1$, and the grooves 61 to 72, inclusive, by currents $i_3 i_2$. This I have attempted to indicate by the six curved arrows, each sixty degrees long, on the outside of Fig. 3, these six arrows corresponding to the six groups of armature-circuits. It is to be understood that each of these arrows is marked with the amount of current which traverses each or any of the armature-grooves in that portion of the circumference along which they extend.

Let us now assume that the exciter-brushes are connected to a source of triphase current, and since this invention, as above pointed out, is particularly applicable to asynchronous machines let us assume that the exciter-brushes are connected to the three secondary circuits of such an asynchronous machine, although, as will be apparent, they might also be connected to the primary circuits. Manifestly we may take $$i_1 = A \sin. 2\pi at; \; i_2 = A \sin. 2\pi (a+\tfrac{1}{3}) t; \; i_3 = A \sin. 2\pi (a+\tfrac{2}{3}) t$$

where $a$ is the frequency. The intensity of the magnetic flux along the line $F_1$ in Fig. 2 may be calculated by assuming the windings of each of the six groups of the armature to be concentrated at the center of each group. In order to find the magnetizing effect of the armature-windings along the axis $F_1$, we must manifestly project these armature-windings upon a diametrical plane perpendicular to the axis $F_1$. Designating by N the number of turns in each group of conductors, the intensity of magnetization along the arrow $F_1$ is equal to $$4\pi N \left[ (i_1 - i_3) \cos. \frac{2\pi}{6} + (i_2 - i_3) \cos. 0 + (i_2 - i_1) \cos. \frac{-2\pi}{6} \right] = 6\pi N (i_2 - i_3)$$

which is seen to be the proper value for the purpose I have in view. Similarly, we can calculate that the intensity of magnetization along the arrow $F_2$ is proportional to $i_3 i_1$ and that the intensity of the magnetization along the arrow $F^3$ is proportional to $i^1 i^2$.

Let us now again consider the armature-circuits between the first pair of brushes—that is, between the brush II and the brush III. Recalling the mode of winding of this armature-circuit by reference to Fig. 11, it will be remembered to consist of a number of loops displaced around the circumference of the armature through one hundred and twenty degrees—that is to say, considering as a loop the structure A of Fig. 10, which consists of a wire carrying a current in a given direction, together with a diametrically opposite wire carrying current in the opposite direction, it is seen that the armature-circuit between the first pair of brushes, which we assume to be connected to the secondary circuit carrying the current $i_1$, is composed of twenty-four loops lying in the diametrically opposite pairs of grooves 1 to 37 to 24 to 60, inclusive; but the magnetic flux $F_1$, whose intensity is proportional to $i_2 i_3$ is seen to lie at the very center of this group of armature-circuits passing from the brush II to the brush III, so that in the rotation of the armature this group of armature-windings cuts straight across this magnetic flux, whereby, as has been above explained, there is generated in this armature-winding an electromotive force having the same frequency as that of the currents $i_1 i_2 i_3$ and having a phase ninety degrees, or thereabout, in advance of the current $i_1$. The magnitude of this leading electromotive force increases with the speed of rotation of the armature. As similar remarks manifestly apply to the armature-circuits between the other two pairs of brushes and to the magnetic axes which they cut, it will be seen that the first problem which I have proposed to myself has been solved. I need merely add that this solution does not require an exciter of any considerable power of size and that there is but little sparking in its brushes.

I may here call attention to the fact that the periodic variations of the field $F_1$, due to the variation of the current $i_2 i_3$ develops no electromotive force in the circuit which passes from the brush II to the brush III on the assumption that the armature is stationary. It is the rotation of the armature across this field which develops the leading electromotive force between the brushes, the magnitude of which electromotive force is proportional to the speed of rotation of the armature. If, however, we consider the magnetic field developed by the armature-windings at right angles to the axis $F_1$, which calculation shows to be proportional to $Ni_1$, we see that although the electromotive force developed between the brushes II and III by the rotation of the armature with relation to this field $Ni_1$ is manifestly zero, yet the periodic variations of the field $Ni_1$, due to the variations of the currents $i_1$, under the assumption that the armature is stationary, acts to develop between the brushes II and III an electromotive force of a magnitude proportional to the frequency $a$ of the current $i_1$. This electromotive force is of a kind to increase the self-induction of the asynchronous secondary circuit to which it is connected. Since, however, I always make the revolutions per second of the exciter-armature much greater than the frequency per second of the alternating-current circuit to which it is connected, it will be seen that the disturbing electromotive force, due to the magnetization $Ni_1$, the intensity of which is proportional to $a$, may be disregarded with reference to the leading electromotive force, the intensity of which is proportional to the armature speed.

It is now seen why I preferably connect my exciter to the secondary circuits of the asynchronous machine. These being in normal operation traversed by currents of the low slip frequency—say two per second—I may readily rotate my armature at ten times this speed. If the exciter were connected to the primary of the asynchronous machine, carrying currents of line frequency at, say, sixty cycles, the speed of my exciter-armature might readily have to be excessive.

I have been describing means for producing the effect of a negative reactance in alternating-current circuits, and while this means may manifestly be applied to alternating-current circuits connected with any desired source of alternating or multiphase currents, it will yet be seen that my means for producing an effective negative reactance are peculiarly applicable to the secondary circuits of asynchronous machines, whether used as generators or as motors, and I have, therefore, to avoid the use of alternatives and complicated descriptive terms, described my invention above in its application to the secondary circuits of asynchronous machines.

I have now to describe the means which I have devised for adding what is, in effect, a negative ohmic resistance to an alternating-current circuit and more particularly to that type of an alternating-current circuit which is found in the secondary of an asynchronous machine. To this end I simply arrange on the stator of my exciter separate field-windings, each in series with an armature-brush, and each arranged to produce a magnetization at right angles to the diametrical line of the armature-brush to which it is connected. Since each field-winding is in series with the armature-brush, the variations of the field produced by it will have the same phase as the current in the brush. The rotation of the armature in the field will thus produce an electromotive force of the same phase as the current in the brushes, or dephased by one hundred and eighty degrees with respect thereto according to the direction which is given to the field-winding. To produce the effect of a negative resistance in the secondary circuit, the exciter should consume in the secondary an electromotive force in opposition with the secondary current. This means that the exciter induces in the secondary an electromotive force in opposition with the voltage effect of or the voltage inserted by the secondary current.

In Fig. 9 I have shown a bobbin A located in those diametrically opposite grooves of the stator which are in line with the brush I. This bobbin has the wire of exit connected to the brush I and its wire of entry located at the point 1. Manifestly this bobbin will produce a magnetization at right angles to the diametrical direction of the brush I. Similarly I have placed a bobbin A' in the two diametrically opposite grooves of the stator which are in line with the brush II and a third bobbin A'' in the two diametrically opposite grooves which are in line with the brush III, and I have connected the terminals of these bobbins to the brushes in the manner indicated in Fig. 9. The three free terminals of the alternating-current circuit, or more especially of the secondary circuit of the asynchronous machine, are respectively connected to the incoming terminals 1 2 3 of the bobbins A A' A''. From what has been said it is evident that by absorbing or by spending work on the shaft of the exciter we can artificially increase or diminish the apparent effective ohmic resistance of the alternating-current circuits or of the secondary circuits of the asynchronous machine just as I have heretofore shown how to artificially vary their coefficient of self-induction.

By adding a field similar to that shown at A A' A'' to the stator structure, but shifted ninety degrees from the field-winding A A' A'', I can produce a field which will either add itself to or substract itself from that produced by the rotor; but as this is a matter which is well understood in the art no specific description of it is needed.

I have assumed in the preceding description that the exciter is bipolar; but then there may be any number of poles, it being sufficient to multiply the number of notches formed in the stator in proportion to the number of poles. There is no relation between the number of poles of the exciter and those of the induction-machine which it must excite, nor is there any necessary relation between the rotary speeds of these two machines, although it is advantageous to rotate the exciter as fast as possible.

If it be desired to avoid intermediate gearing and to drive the exciter from the same source of mechanical power as the induction-machine, we may mount the exciter on the shaft of the induction-machine, as is shown in Figs. 5 and 6, where 1 is the induction-machine and 2 is the exciter. The journal-box, which is opposite the exciter, may be lubricated by an oiler T, and a plug U may be used in withdrawing the oil from the journal-box. The induction-machine is of the usual construction, and the construction of the exciter has been sufficiently described heretofore. I need merely add that each of the rods $w\ y\ z$ bears a brush which rests on the commutator of the exciter and another brush electrically connected with the first which bears on one of the three slip-rings connected to terminals of the secondary circuits of the asynchronous machine. In this manner the terminals of the secondary circuits of the asynchronous machines are respectively connected to the exciter-brushes.

In the preceding description I have assumed that the frequency of the currents developed in the secondary circuits and impressed upon the exciter-brushes is small as compared with the frequency of rotation of the exciter. Now when the asynchronous machine has attained its normal speed the frequency of the current in the secondary circuit of this machine—that is, the slip frequency—may easily be taken as low as 2. It will manifestly be quite possible then to rotate the exciter at ten times this speed. If, however, we should connect an exciter of the kind I have described and rotating at the frequency 20 with the secondary circuits of an asynchronous machine when this is starting in operation, it will be found that the slip frequency of the secondary currents may be readily as great or even greater than the frequency of rotation of the exciter-armature. This exciter instead of reducing the self-induction of the asynchronous machines would then actually act to increase it. This follows from what has been said in a previous paragraph with relation to those disturbing electromotive forces which are proportional to the frequency $a$ of the secondary currents. One means of overcoming this difficulty would be to increase the speed of rotation of the exciter, so as always to have the frequency of the exciter-armature rotation much greater than the frequency of the secondary currents in the asynchronous machine even at starting. We might then reduce the exciter-armature speed as the asynchronous machine approximates normal speed and the slip frequency of its secondary currents is diminished; but this would be an inconvenient if not an impracticable arrangement. I therefore prefer to use in starting the asynchronous machine any common type of starting-rheostats, such as those shown in Fig. 7. The secondary circuits of the asynchronous machine are assumed to terminate at the extremities 10 11 12 of the conducting-levers 6 7 8, connected by the insulating cross-bar 9. These levers rest on the segments 3 4 5, respectively, of rheostats 13 14 15, the end terminals 17 18 19 of which are connected to the short-circuiting bar 16. To each rheostat is added a terminal 20 21 22, each connected with one of the three brushes of the exciter-armature.

When the asynchronous machine is starting up, its secondary circuits will pass through a maximum amount of resistance. As the speed increases, this resistance is diminished by throwing the upper ends of the levers 6 7 8 to the right. All this is the usual practice. When the induction-machine has finally attained its normal speed, the levers 6 7 8 are thrown on the terminals 20 21 22, respectively, so that each secondary circuit 10 11 12 is connected to its appropriate exciter-brush through the levers 6 7 8 and the terminals 20 21 22.

I have in the preceding description attempted to draw no distinction between the asynchronous machine operating as a motor or operating as a generator, since my invention is applicable in either case; but when the asynchronous machine is used as a motor it will generally be inconvenient to regulate the action of the exciter associated therewith under variations of load of the asynchronous or induction motor. I therefore in this case design my exciter so as to give unit power factor to the induction-motor to which it is connected when this operates at mean load. Since matters vary slowly in the neighborhood of mean load, this power factor will always remain quite near unity when the motor-load varies. If there are a number of induction-motors fed from the same line, each associated with one of my exciters, which motors worked on different loads, some of these motors will take wattless current from the line and other motors will furnish wattless current to the line, so that the amount of the wattless currents which the central station has to furnish is practically zero; but when my exciters are to be used in connection with induction-generators it will be desirable to vary their action—that is, to vary their speed of rotation—during the variation of load. I have shown in Fig. 8 generators of the asynchronous type IV, V, VI, and VII connected to the triphase line by switches VIII. The machine VII, however, instead of being used as an induction-machine is used as a synchronous generator which fixes the frequency and voltage of the line-current which the induction-generators IV V VI are to furnish and acts, in fact, very much as the leader of an orchestra. To convert this machine VII into a synchronous machine, it is necessary merely to disconnect one of its brushes and to connect its other two brushes, through a rheostat XIX, with the circuit XV, fed by the direct-current generator XVII. The rheostat XIX may be used to keep the voltage at the terminals of the synchronous alternator VII constant; but I much prefer to use the voltage-regulator of my application, Serial No. 137,933, filed January 5, 1903.

The synchronous generator VII is driven by a steam or hydraulic motor provided with a regulator which is not very sensitive, and the induction-generators IV, V, and VI are driven by steam or hydraulic motors provided with sensitive regulators which maintain their speed as constant as possible. At the unloaded condition the arrangement is such that the synchronous machine VII rotates with the same speed as the induction-machine. This being put, it will now be plain that an increase of load on the synchronous machine slows it down, thus increasing the slip of the induction-machines, which carries with it the ability of the induction-machines to take a greater load, and thus distributes the load between the synchronous machine and the induction-machines in a uniform manner.

To the secondary of the induction-machines IV, V, and VI are connected the brushes of my exciters IX, X, and XI, which need not be further described here, since they have been described at great length in a prior portion of this specification. While there are numerous ways in which these exciters may be driven, I have preferred to arrange on each of their shafts a small direct-current motor XIII, taking current from the line XV through circuits having switches XIV. By opening these switches the exciters are stopped, and thus placed out of operation. On the other hand, by actuating the rheostat XVIII in the line XV the speeds of the several motors XIII, and with it the speeds of the exciters to which they are connected, may be increased or decreased and varied in a suitable manner. Now to each value of the voltage of the line of the power factor to the line and of the intensity of the current which is furnished to the same by one of the induction or asynchronous generators corresponds a well-determined value of the intensity of the exciting-current which this machine requires. If the exciting-current furnished to the induction-machine under consideration by the exciter associated therewith has some different intensity from that actually required, a wattless current will pass from the asynchronous generator to the synchronous generator or from the synchronous generator to the asynchronous generator. All that is necessary, therefore, to prevent this passage of wattless currents between the synchronous generator and the asynchronous generators is to give such a speed to the several exciters of the asynchronous generators as will furnish the proper magnetization-currents to the asynchronous machines with which they are connected. By manipulating the rheostat XVIII it will be possible to increase or decrease the speeds of the exciters IX, X, and XI, and with it the intensity of the exciting-currents furnished by them, so that the intensity of the wattless or correction current flowing between the generators will be zero. This result can always be obtained so long as the load on the generators does not much exceed their maximum load.

The process disclosed herein is covered in my companion application, Serial No. 192,226, filed February 5, 1904.

I claim—

1. The combination of a source of multiphase current, and a phase-regulating dynamo-generator of the direct-current type having its armature connected to the several branches of the multiphase circuit and having its field traversed by a periodically-varying flux, substantially as described.

2. The combination of a source of multiphase current, and a phase-regulating dynamo-generator of the direct-current type having its armature connected to the several branches of the multiphase circuit and having its field traversed by a variable flux of the frequency of the multiphase current, substantially as described.

3. The combination of an asynchronous machine having multiphase secondary circuits, and a phase-regulating dynamo-generator of the direct-current type having its armature connected to the several branches of the multiphase secondary circuits and having its field traversed by a variable flux of the frequency of the secondary currents, substantially as described.

4. The combination of a source of alternating current, and a phase-regulating dynamo-generator of the direct-current type having its armature electrically connected to said source, and provided with armature-windings to generate a magnetic field flux of the frequency of the alternating current for producing the regulating electromotive forces, substantially as described.

5. The combination of an asynchronous machine, a phase-regulating dynamo-generator of the direct-current type having its armature electrically connected to the asynchronous secondary and provided with armature-windings to cause a magnetic field flux of the same frequency as those of the secondary currents for producing the regulating electromotive forces, substantially as described.

6. The combination of a source of multiphase current, a dynamo-generator of the direct-current type having dephased brushes connected to the multiphase circuit and having an armature-winding producing fluxes to impress a leading or lagging electromotive force on the multiphase circuit, substantially as described.

7. The combination of an asynchronous machine, a dynamo-generator of the direct-current type having dephased brushes connected to the asynchronous secondary circuits and having an armature-winding producing fluxes to impress leading electromotive forces on the secondary circuits, substantially as described.

8. The combination of an asynchronous generator, a dynamo-generator of the direct-current type having dephased brushes connected to the asynchronous secondary circuits and having an armature-winding producing fluxes to impress leading electromotive forces on the secondary circuits, substantially as described.

9. The combination of a source of multiphase current, and a phase-regulating dynamo-generator of the direct-current type having a set of dephased armature-windings and a corresponding set of dephased brushes connected to the multiphase circuits, substantially as described.

10. The combination of a source of multiphase current, and a phase-regulating dynamo-generator of the direct-current type having a set of dephased brushes connected to the multiphase circuits and a corresponding set of armature-windings acting to produce field fluxes to generate regulating electromotive forces between the brushes upon rotation of the armature, substantially as described.

11. The combination of a source of multiphase current, and a phase-regulating dynamo-generator of the direct-current type having a set of dephased brushes connected to the multiphase circuits and corresponding set of armature-windings acting to produce field fluxes to generate regulating electromotive forces between the brushes upon rotation of the armature, the frequency of the rotation of the armature being large in comparison with the frequency of the multiphase currents, substantially as described.

12. The combination of an asynchronous machine, and a phase-regulating dynamo-generator of the direct-current type having a set of dephased brushes connected to the multiphase secondary circuits of the asynchronous machine and a corresponding set of armature-windings acting to produce field fluxes to generate regulating electromotive forces between the brushes upon rotation of the armature, substantially as described.

13. A phase-regulating dynamo-generator of the direct-current type having a number of dephased brushes and a corresponding number of dephased armature-circuits connected thereto, substantially as described.

14. A phase-regulating dynamo-generator of the direct-current type having three dephased brushes and three dephased armature-windings connected thereto, substantially as described.

15. The combination of a source of triphase currents, and a phase-regulating dynamo-generator of the direct-current type having three dephased brushes connected to the triphase circuit and having six groups of armature-windings, the several conductors in any group being traversed by currents of the same value, and the totality of groups acting to generate field fluxes which give rise to regulating electromotive forces upon rotation of the armature.

16. The combination of a source of triphase current, and a phase-regulating dynamo-generator of the direct-current type having its armature connected to the several branches of the triphase circuit and having its field traversed by a variable flux of the frequency of the triphase current, substantially as described.

17. The combination of an asynchronous machine having triphase secondary circuits, and a phase-regulating dynamo-generator of the direct-current type having its armature connected to the three branches of the secondary circuits and having its field traversed by a variable flux of the frequency of the secondary currents, substantially as described.

18. The combination of a source of triphase currents, and a dynamo-generator of the direct-current type having dephased brushes connected to the triphase circuit and having an armature-winding producing fluxes to impress a leading or lagging electromotive force on the triphase circuit, substantially as described.

19. The combination of a source of triphase currents, and a phase-regulating dynamo-generator of the direct-current type having its armature connected to the several branches of the triphase circuit and having its field traversed by a periodically-varying flux, substantially as described.

20. The combination of an asynchronous machine comprising a primary and a secondary member and a device constituting an apparent negative, ohmic resistance added to one of its members, whereby the slip or frequency drop is diminished, substantially as described.

21. The combination of an asynchronous machine comprising a primary and a secondary member and, added to one of its members, a source of alternating electromotive force of the frequency of the current existing in that member but in opposition to the voltage inserted by that current, whereby the slip or frequency drop is diminished, substantially as described.

22. The combination of an asynchronous machine having a primary and a secondary member, and a device added to the secondary member which constitutes an apparent, negative ohmic resistance equal to the secondary resistance, whereby the asynchronous machine may be operated as such at constant synchronous speed, substantially as described.

23. The combination of a source of alternating current and a dynamo-generator of the direct-current type having its brushes connected thereto and having a series field-winding generating a flux at right angles to the brush to which it is connected to produce the effect of a negative resistance, substantially as described.

24. The combination of an asynchronous machine, and a dynamo-generator of the direct-current type having its brushes connected to the secondary circuits and having one or more series field-windings to generate a flux or fluxes at right angles to the brush or brushes to which they are connected to produce the effect of a negative resistance, substantially as described.

25. The combination of a source of triphase current, and a dynamo-generator of the direct-current type having three dephased brushes, and a series field-winding for each brush generating a flux at right angles to the brush to produce the effect of a negative resistance, substantially as described.

26. The combination of an asynchronous generator, and a synchronous generator electrically connected thereto and driven to have a greater drop in speed under increasing load than that of the asynchronous machine, substantially as described.

27. The combination of an asynchronous generator, a source of power for driving it having a sensitive speed-regulator, a synchronous generator electrically connected to the asynchronous generator, and a source of power for driving it having a less sensitive speed-regulator than that first mentioned, substantially as described.

28. The combination of a synchronous generator, one or more asynchronous generators electrically connected therewith, a phase-regulating exciter connected to each asynchronous generator, and a common source of power for driving the several exciters, substantially as described.

29. The combination of a synchronous generator, one or more asynchronous generators electrically connected therewith having a lesser drop in speed under increasing load, a phase-regulating exciter connected to each asynchronous generator, and a common regulable source of power for driving the several exciters, whereby the sum of the wattless currents flowing in the generator system may be rendered zero, substantially as described.

30. The combination of an asynchronous machine and a device constituting an apparent negative, ohmic resistance added to its secondary member, whereby the slip or frequency drop is diminished, substantially as described.

In testimony whereof I have signed my name to this specification in the presence of two subscribing witnesses.

MAURICE LEBLANC.

Witnesses:
HONORÉ PROCHASSON,
AUGUSTUS E. INGRAM.